(No Model.)
H. D. THATCHER & H. P. BARNHART.
HAND DEVICE FOR MILKING COWS.
No. 282,683. Patented Aug. 7, 1883.
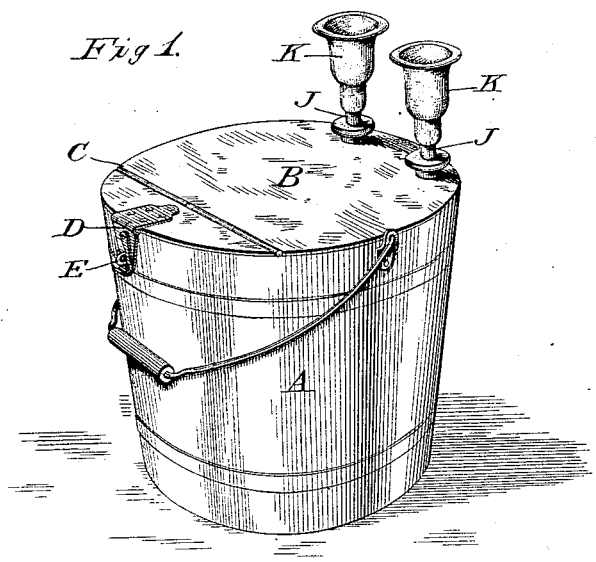
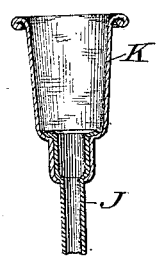
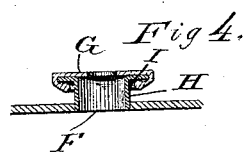
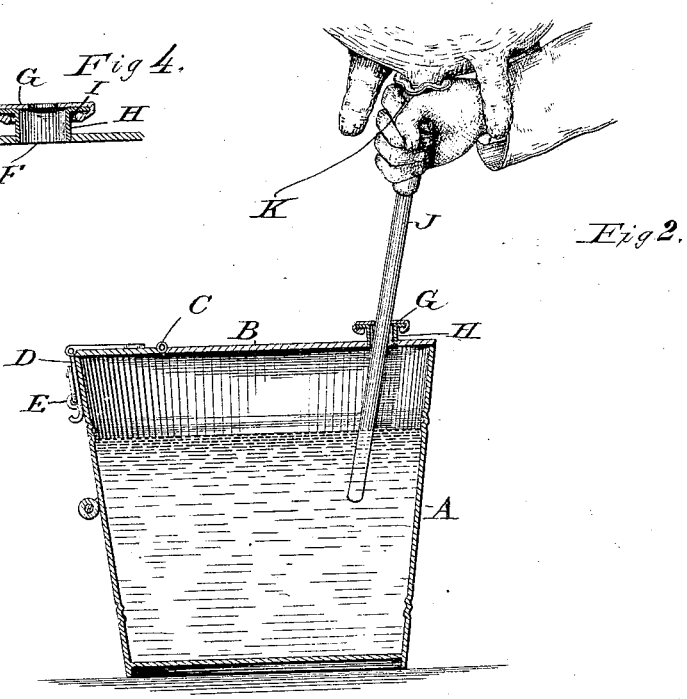
WITNESSES
INVENTORS

United States Patent Office.

HERVEY D. THATCHER AND HARVEY P. BARNHART, OF POTSDAM, N. Y.

HAND DEVICE FOR MILKING COWS.

SPECIFICATION forming part of Letters Patent No. 282,683, dated August 7, 1883.

Application filed April 4, 1883. (No model.)

*To all whom it may concern:*

Be it known that we, HERVEY DEXTER THATCHER and HARVEY PATTEN BARNHART, citizens of the United States, and residents of Potsdam, in the county of St. Lawrence and State of New York, have invented certain new and useful improvements in means for protecting milk from contact with foreign matters while in transit from the teat of the animal yielding the same to a closed vessel for receiving the same, of which the following is a full, clear, and exact description, reference being had to the accompanying drawings, making a part of this specification.

Similar devices and parts of devices shown in the separate figures bear similar letters of reference.

The design of our invention is to make a covered vessel or pail into which milk can be drawn from the cow by the hand of the operator without exposing the same while in transit from the teat to the pail to foul odors of any kind, or allowing any foreign substance—such as hair, dandruff, manure, drippings, or dirt of any kind—to commingle with the milk either while in transit to the pail or after its deposit therein.

It is a further design of our invention to prevent any loss of milk by spilling or by misdirected streams during the operation of hand-milking, or by the upsetting of the pail by a vicious or restless animal, or damage to the same or its contents by her stepping into the pail. Furthermore, the practice of our invention prevents the soiling of the milker's clothing, leaves no offensive odor upon his hands, and effectually prevents the laceration of the teats of the animal by the finger-nails, and in the case of an animal having short teats, will keep the hands of the milker from coming into contact with the flowing milk. Furthermore, the milk being transferred from the udder to a closed vessel without coming into contact with the slightest impurity, it follows that the tedious and imperfect operation of "straining" is entirely dispensed with.

While some of the advantages above enumerated have been attempted to be gained in hydraulic and pneumatic milking apparatus of various designs and constructions, we have found in practice that none of them with which we are familiar are free from serious objections arising from their great complexity of construction and their consequent liability to get out of repair. Our invention, on the contrary, is exceedingly simple, secures all its advantages with certainty and precision, and is without liability to get out of working order.

To this end the nature of our invention consists in the improved means for transferring the milk from the cow's udder to a closed vessel, as hereinafter described, and particularly pointed out in the claims.

Figure 1 is a perspective view of our improved means for conducting, receiving, and containing the milk drawn from the cow. Fig. 2 is a vertical cross-section of the pail, showing also in perspective the mode of filling the closed vessel. Figs. 3 and 4 are details.

A is a pail or bucket provided with the common bail, and having the cover or top B secured to the upper edge thereof. This cover may be firmly attached to the upper rim of the pail. It is preferably, however, made detachable therefrom for cleansing and purifying purposes, and is provided with a hinge, C, allowing a segment-lid thereof to turn back upon the cover for the convenient discharge of the contents. The segment-lid of the cover is provided with the hinged securing-latch D, by which the same is locked to the staple E set in the side of the pail, as shown. In the cover, advisedly on the side opposite the hinged lid, is provided one or more orifices, F, adapted to be covered by a perforated elastic disk, G, as hereinafter described. This disk is preferably constructed of rubber or other elastic fabric, and the perforation therethrough, owing to such construction, is capable of distention when pressed open by the tube or conductor to be presently described, but adapted to maintain a secure and close engagement with the said tube at all points and at any angle of its adjustment.

H is a short nozzle or spout-shaped sleeve secured to the cover within the orifice F, and having a flange, I, turned out from its upper peripheries, (see Fig. 4,) which we have found in practice a very convenient means by which to attach simply and securely the perforated diaphragm or disk to the opening. The disk, being sprung over the flange, contracts at once thereupon, and remains taut and firmly seated until necessity for removal arises, when it is quickly and easily detached.

J is a tube, of hard rubber, metal, soft rubber, or suitable fabric, six inches (more or less) in length, and of a bore-diameter sufficient to carry freely the milk ordinarily discharged by a single teat. This tube is adapted to fit within the orifice F in the cover of the pail, and slide freely up and down therein, either vertically or at an angle. At its superior extremity the tube is enlarged somewhat, being preferably bell-shaped or flanged, (see Fig. 3,) to adapt it to secure a suitable seat within the lower or bottom portion of the teat case or sheath K. This sheath or teat-case K is, as its name implies, a covering for the teat, made of such form as to resemble in outward configuration the ordinary cow's teat. It may be constructed of rubber, impervious cloth, or pliable fabric slightly or considerably enlarged at the upper portion, and having an inward taper toward the lower extremity, which is perforated to receive the sliding tube. (See Fig. 3.) The teat can thus, whatever its size, always rest on the bottom of the sheath-cavity, with its opening directly registering with the mouth of the conducting-tube seated in the sheath. It is important that the lower or perforated extremity of the sheath should be elastic, and so constructed as to accurately and snugly contract about the superior mouth of the conducting-tube, and yet be adapted for easy and quick removal therefrom for cleansing and for readjustment for use. It is furthermore apparent that our device would fail to be operative if these conditions were reversed and the lower or bottom portion of the sheath were made inflexible or rigid, to be elastically grasped by the engaging-mouth of the elastic conducting-tube, as is common in pneumatic milking-machines, wherein escape of the air from the rigid teat-cup is to be guarded against.

There are several ways known to us whereby the teat case or sheath may be retained in position while operating the same in drawing the milk from the cow. A ring or rings may be attached thereto, through which the thumb or finger—one or both—may pass, and thereby sustain the same in place. A mere protuberance thereupon will do. A spring lightly coiled about it will also accomplish the end desired. We prefer, however, a slight enlargement at the top of the sheath, carrying an elastic wire, cord, whalebone, or similar means to cause the upper extremity of the sheath to at once assume an expanded position on the removal of pressure therefrom; or the sheath may be rolled upon itself at its upper extremity, as shown.

The operation of our improvement is apparent. The conducting-tube being slid within the teat-case until the bell-shaped mouth or flanged extremity is firmly grasped by the elastic aperture at the lower end of the sheath, the tube is then passed through the orifice in the cover of the pail. If the operator, as is usual, desires to use both hands, two conductors or milk-tubes are thus adjusted. Then a sheath or teat-case thus equipped is grasped in each hand and securely fixed upon a teat, and the process is conducted otherwise as usual. The pail is placed under the milking-stool; or a seat may be expressly provided therefor, in which case the conducting-tubes would pass from the teats to the pail obliquely; or the pail may be set directly under the teats, in which case the tubes would occupy a vertical position. Precaution to guide the milk to the pail is unnecessary in any event, the tubes effectually controlling its passage thereto. At each closing of the hand, expelling the milk from the teat, there will necessarily be a downward movement, provision for which is made by the facility with which the tubes slide up and down within the apertured or expanding and contracting orifices in the cover of the pail.

We desire it to be distinctly understood that we do not consider this invention as limited to the particular devices employed for maintaining a perfect isolation of the milk from contact with foreign matters while in transit from the teat of the cow to the closed containing-vessel, for it is evident that many devices other than those described might be effectively employed. Such would manifestly be included within the scope of our invention.

Having therefore fully and clearly described the principle of our invention and pointed out what we consider the best means for carrying the same into practice, what we claim as new, and desire to secure by Letters Patent of the United States, is—

1. That improvement in means for hand-milking which consists of the combination, with a milking-tube provided at one end with a flexible sheath, adapted to closely embrace the teat of the animal yielding the milk, of a closed vessel having an orifice provided with a perforated elastic diaphragm, through which the reverse end of the tube freely slides, whereby the flowing milk is isolated from contact with all foreign matters, odors, &c., while in transit from the teat to the vessel, and is kept isolated therefrom after its deposit in the latter, as set forth.

2. The combination, with the tube J, provided with flexible sheath K, of the vessel A, having closed top or cover B, provided with sleeve H, having the perforated elastic diaphragm G, secured to its mouth, as and for the purpose set forth.

HERVEY D. THATCHER.
HARVEY P. BARNHART.

Witnesses:
G. B. JOHNSTON,
SAMUEL C. CRANE.